(12) United States Patent
Muthusamy et al.

(10) Patent No.: US 9,284,224 B2
(45) Date of Patent: Mar. 15, 2016

(54) CEMENT COMPOSITIONS AND METHODS OF USING THE SAME

(75) Inventors: Ramesh Muthusamy, Pune (IN); Tushar Sureshgiri Gosavi, Pune (IN); Rahul Chandrakant Patil, Pune (IN); Ashok K. Santra, The Woodlands, TX (US); Sandip Prabhakar Patil, Pune (IN); Kameswara Sri Sairam Pindiprolu, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 622 days.

(21) Appl. No.: 13/606,632

(22) Filed: Sep. 7, 2012

(65) Prior Publication Data

US 2012/0325478 A1 Dec. 27, 2012

Related U.S. Application Data

(63) Continuation-in-part of application No. 13/107,055, filed on May 13, 2011, now Pat. No. 8,627,888.

(51) Int. Cl.
| | |
|---|---|
| *E21B 33/138* | (2006.01) |
| *C04B 28/02* | (2006.01) |
| *C09K 8/467* | (2006.01) |
| *C09K 8/42* | (2006.01) |
| *C09K 8/473* | (2006.01) |
| *C04B 28/18* | (2006.01) |
| *C04B 111/10* | (2006.01) |
| *C04B 111/20* | (2006.01) |
| *C04B 111/22* | (2006.01) |
| *C04B 111/23* | (2006.01) |

(52) U.S. Cl.
CPC ............. *C04B 28/021* (2013.01); *C04B 28/18* (2013.01); *C09K 8/426* (2013.01); *C09K 8/467* (2013.01); *C09K 8/473* (2013.01); *E21B 33/138* (2013.01); *C04B 2111/1037* (2013.01); *C04B 2111/2015* (2013.01); *C04B 2111/2092* (2013.01); *C04B 2111/22* (2013.01); *C04B 2111/23* (2013.01); *Y02W 30/92* (2015.05); *Y02W 30/93* (2015.05); *Y02W 30/94* (2015.05)

(58) Field of Classification Search
CPC ......... C04B 24/06; C04B 18/08; C04B 28/02; C04B 28/04; C09K 8/467; C09K 8/426; C09K 8/46; E21B 33/13; E21B 33/138; E21B 33/14

See application file for complete search history.

(56) References Cited

U.S. PATENT DOCUMENTS

| | | | |
|---|---|---|---|
| 5,900,053 A | 5/1999 | Brothers et al. | |
| 6,145,591 A | 11/2000 | Boncan et al. | |
| 6,332,921 B1 | 12/2001 | Brothers et al. | |
| 6,989,057 B2 * | 1/2006 | Getzlaf | C04B 14/047 106/606 |
| 7,353,870 B2 | 4/2008 | Roddy et al. | |
| 7,576,040 B2 * | 8/2009 | Lewis et al. | 507/206 |
| 7,743,828 B2 | 6/2010 | Roddy et al. | |
| 8,627,888 B2 | 1/2014 | Santra et al. | |
| 2005/0133222 A1 * | 6/2005 | Di Lullo Arias | C04B 14/047 166/292 |
| 2005/0160945 A1 | 7/2005 | Barlet-Gouedard et al. | |
| 2008/0028994 A1 | 2/2008 | Barlet-Gouedard et al. | |
| 2008/0066654 A1 | 3/2008 | Fraser | |
| 2008/0066655 A1 | 3/2008 | Fraser | |
| 2008/0302276 A1 * | 12/2008 | Perez-Pena et al. | 106/690 |
| 2010/0044043 A1 | 2/2010 | Roddy et al. | |
| 2010/0258312 A1 | 10/2010 | Brenneis et al. | |
| 2010/0294496 A1 | 11/2010 | Woytowich et al. | |

FOREIGN PATENT DOCUMENTS

| | | |
|---|---|---|
| CA | 2 316 059 A1 | 2/2001 |
| EP | 2093200 A1 * | 8/2009 |
| GB | 2 385 326 A | 8/2003 |
| GB | 2 387 613 A | 10/2003 |
| WO | WO 2007/048999 A1 | 5/2007 |
| WO | WO 2010/135522 A1 | 11/2010 |
| WO | 2012069024 A2 | 5/2012 |
| WO | 2014039301 | 3/2014 |

OTHER PUBLICATIONS

International Search Report and Written Opinion for PCT/GB2012/000430 dated Oct. 19, 2012.
International Search Report and Written Opinion for PCT/US2013/056577 dated Feb. 14, 2014.
Suyan et al., "Novel Cement Composition for Completion of Thermal Recovery (ISC) Wellbores," SPE/IADC 101848, 2006.
Banerjee, et al., "Engineered Kick-Off Plugs to Reduce Unproductive Downtime in Sidetracking Operation," SPE/IADC 125727, 2009.
Halliburton Brochure, "Microbond HT™ Cement Additive," 2007.
Halliburton Brochure, "HR®-4 Cement Retarder," 2010.
Halliburton Brochure, "HR®-5 Cement Additives," 2007.
Halliburton Brochure, "HR®-7 Cement Retarder," 2007.
Halliburton Brochure, "HR®-15 Cement Retarder," 2007.
Halliburton Brochure, "HR®-601 Cement Retarder," 2008.
Halliburton Brochure, "SCR-100™ Cement Retarder," 2010.
Halliburton Brochure, "SCR-500L™ High-Temperature Retarder," 2007.
Halliburton Brochure, "CFR-3™ and CFR-3L™ Dispersant," 2012.
Halliburton Brochure, "D-Air 3000™ and D-Air 3000L™ Defoamer," 2012.
Halliburton Brochure, "VersaSet Thixotropic Additive," 2007.

* cited by examiner

*Primary Examiner* — Zakiya W Bates
(74) *Attorney, Agent, or Firm* — McDermott Will & Emery LLP; Craig W. Roddy

(57) ABSTRACT

Cement compositions may comprise an aluminosilicate; a sodium aluminate, a calcium aluminate, a potassium aluminate, or a combination thereof; and water. In some cases, the cement does not include Portland cement. The cement may be used in a subterranean formation having corrosive components therein, wherein the set cement sheath is resistant to degradation from the corrosive components within the subterranean formation.

13 Claims, 2 Drawing Sheets

CEMENT COMPOSITIONS AND METHODS OF USING THE SAME

CROSS-REFERENCE TO RELATED APPLICATIONS

This application is a continuation-in-part application of U.S. patent application Ser. No. 13/107,055, entitled "Settable Compositions Containing Metakaolin Having Reduced Portland Cement Content," filed on May 13, 2011, the entire disclosure of which is incorporated herein by reference.

BACKGROUND

The present invention relates to cement compositions suitable for use in subterranean operations. More specifically, the present invention relates to cement compositions resistant to degradation in carbon dioxide containing zones and their use in subterranean cementing operations.

During the construction of a well, such as an oil and gas well, a hydraulic cement is typically placed into the annular space between the walls of the well bore penetrating a subterranean formation and the exterior surface of the well bore casing suspended therein. Such cement compositions have also been placed into the annular space between the walls of concentric pipes, such as a well bore casing and a liner suspended in the well bore. Following placement of the cement composition, further operations in the well bore, such as drilling, may be suspended for a time sufficient to permit the cement to set to form a mass of hardened cement in the annulus. The annular mass of hardened cement is referred to in the art as the "sheath." The cementing procedure resulting in the initial construction of the sheath is often referred to as the primary cementing operation.

The function of a cement sheath may include providing physical support and positioning of the casing in the well bore, bonding of the casing to the walls of the well bore, preventing the movement of fluid (liquid or gas) between formations penetrated by the well bore, and preventing fluid from escaping the well at the surface of the formation. The set cement sheath should be able to endure a number of stresses during various downstream operations after the primary cementing operation.

In practice, a cement sheath may be compromised due to numerous stresses that may cause the cement sheath to fail resulting in a loss of hydraulic seal. In addition to physical stresses such as pressure and shear, conventional cementing materials may be susceptible to chemical alteration. For example, a typical hydraulic cement composition may suffer from carbonization in $CO_2$ rich zones. Portland-based cements, in particular, may contain hydrated cement phases that may readily react with $CO_2$ to form calcite, dolomite, and amorphous silica gel. Such chemical changes may negatively affect the porosity, density and texture of the cement sheath and may affect the sheath's mechanical and hydrologic properties. Moreover, such chemical degradation processes may compound problems arising from the physical stresses on the cement sheath, which in turn may compromise the sheath's hydraulic seal.

The hydraulic seal that the cement sheath provides may be particularly important in maintaining zonal isolation. If the seal becomes compromised, inter-zonal communication may lead to oil and gas flowing to lower pressure zones within the well rather than being directed into the wellbore for production. Loss of seal integrity may also lead to water production or annular pressure build up. Any of these occurrences may require expensive remedial services and/or may even result in the well being shut down in order to comply with regulatory procedures.

SUMMARY OF THE INVENTION

The present invention relates to cement compositions suitable for use in subterranean operations. More specifically, the present invention relates to cement compositions resistant to degradation in carbon dioxide containing zones and their use in subterranean cementing operations.

In some embodiments, the present invention provides methods comprising introducing cement compositions into subterranean formations, wherein the cement compositions comprise aluminosilicates, at least one of a sodium aluminate and a calcium aluminate, and water, and the methods comprising allowing the cement compositions to set to provide set cement sheaths, wherein the set cement sheath is resistant to degradation to corrosive components within the subterranean formation In some embodiments, the present invention provides cement compositions comprising aluminosilicates, at least one of a sodium aluminate and a calcium aluminate, and water, wherein the cement composition does not include Portland cements.

In some embodiments, the present invention provides methods comprising introducing cement compositions into subterranean formations, wherein the cement compositions comprise a metakaolin, a secondary pozzolan additive, at least one of a sodium aluminate and a calcium aluminate, and water, and the methods comprising allowing the cement compositions to set to provide set cement sheaths, wherein the set cement sheaths do not contain Portland cements.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
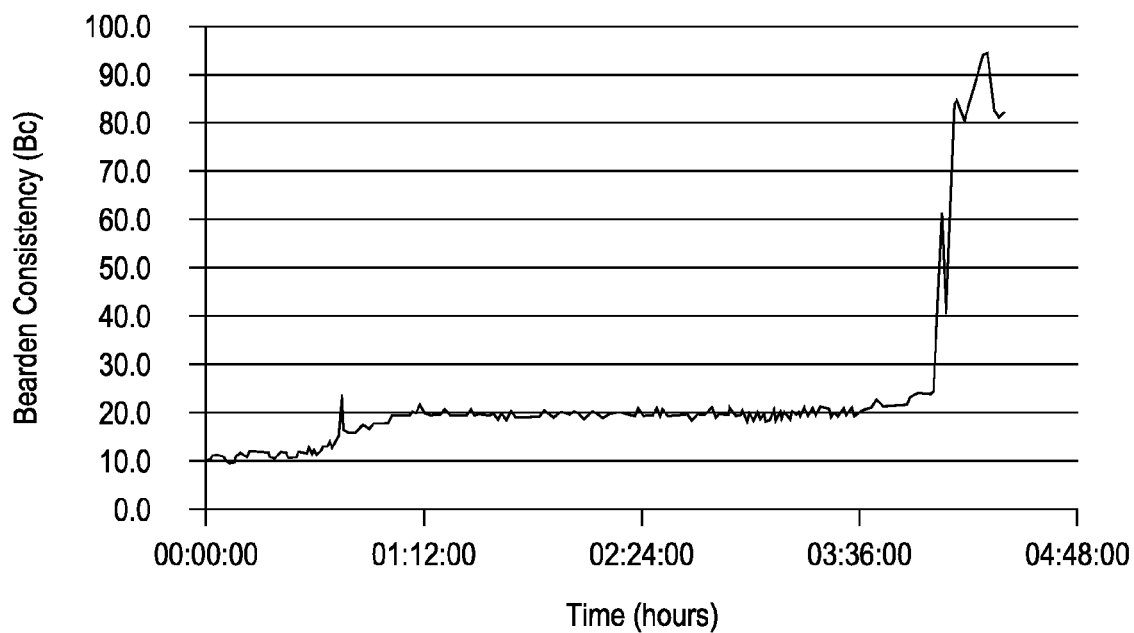
FIG. 1 is a thickening time chart for an exemplary cement composition, in accordance with embodiments disclosed herein.

The present invention relates to cement compositions suitable for use in subterranean operations. More specifically, the present invention relates to cement compositions resistant to degradation in carbon dioxide containing zones and their use in subterranean cementing operations.

The present invention provides methods and compositions for cementing well bores that may prevent or reduce the effects of chemical alteration of a set cement sheath when exposed to various chemical agents. Portland cements are prone to attack by corrosive chemicals such as inorganic salts, carbon dioxide/carbonic acid hydrogen chloride and hydrogen sulfide present in the subterranean formation. For example, carbon dioxide and carbonic acid can attack Portland cements and conver the calcium hydroxide into calcium carbonate and/or calcium bicarbonate. Dissolution and leaching of calcium bicarbonate may increase porosity and/or permeability thereby decreasing overall mechanical strength of the cement sheath. Such occurrence may lead to inefficient zonal isolation and, in extreme cases, complete failure of the cement composition.

Carbon dioxide containing subterranean formations may exist naturally and the cement compositions disclosed herein may be useful in primary cementing operations to provide a set cement sheath that may be chemically resistant to carbon dioxide-induced chemical degradation $CO_2$-containing zones. The compositions of the present invention may also be beneficially employed in remedial cementing operations as well, with similar resistance to chemical stresses.

Moreover, because the cement composition of the present invention resists degradation from carbon dioxide, not only is the integrity of the cement itself improved, but $CO_2$-vulnerable materials inside the sheath, such as reinforcing rods (rebar), also benefit from the protection.

Advantageously, cement compositions of the present invention may provide a complete replacement for the use of Portland cement without compromising the required compressive and shear bond strength of the set cement sheath. Cement compositions and methods of the invention may be employed in any application which indicates the use of a robust cement that is resistant to carbonization or other chemical reactivity associated with conventional hydraulic cements. Other advantages of the methods and compositions disclosed herein will be recognized by those skilled in the art.

In some embodiments, the present invention provides methods comprising introducing cement compositions into subterranean formations, wherein the cement compositions comprise aluminosilicates; an aluminate selected from the group consisting of sodium aluminate, calcium aluminate, potassium aluminate, and a combination thereof; and water, the methods further comprising allowing the cement compositions to set to provide set cement sheaths, wherein the set cement sheath is resistant to degradation to corrosive components within the subterranean formation. In particular embodiments, the base cement composition consists essentially of aluminosilicates combined with an aluminate selected from the group consisting of sodium aluminate, calcium aluminate, potassium aluminate, and a combination thereof. Without being bound by theory, the particular absence of Portland-based cements in cement compositions of the invention impart resistance to $CO_2$-based degradation in the set cement. In some embodiments, resistance to degradation includes resistance to corrosive components including, without limitation, carbon dioxide, hydrogen sulfide, hydrogen chloride, carbonic acid, and mixtures thereof. In some embodiments, Portland-based cements are absent from cement compositions of the invention As used herein, "resistant to degradation" refers to the relative lack of reactivity of the set cement sheath upon exposure to chemical attack, in particular, attack by carbon dioxide and/or carbonic acid. "Resistant to degradation," may also include relative inertness to other chemical stresses on the set cement sheath such as inorganic salts, hydrogen chloride, and hydrogen sulfide. "Degradation" encompasses any alteration in the chemical structure of the set cement sheath leading to compromised set cement sheath integrity as it relates to porosity, texture, compressive or shear strength, ability to maintain hydraulic seal, and other factors apparent to those skilled in the art.

Methods employing cement compositions of the invention may include primary cementing operations, multi-stage cementing operations and remedial (secondary) cementing operations such as plug-back cementing, squeeze cementing, and packer squeeze cementing. Other operations that may include introducing cement compositions of the invention into a subterranean formation include subterranean storage of carbon dioxide, which may provide a means of safe storage of this green house gas and cement-based hazardous material sequestration with underground storage where the set cement may be exposed to carbon dioxide-rich environments.

Another example of a method of the present invention is a method of cementing a conduit (e.g., casing, expandable casing, liners, etc.) disposed in a subterranean formation. An example of such a method may comprise introducing a cement composition comprising aluminosilicates, an aluminate selected from the group consisting of sodium aluminate, calcium aluminate, potassium aluminate, and a combination thereof, and water into the annulus between the conduit and the subterranean formation; and allowing the cement composition to set in the annulus to form a hardened mass. Generally, the hardened mass should fix the conduit in the formation. The method may commence, for example, by introducing the conduit into the subterranean formation. As desired by one of ordinary skill in the art, with the benefit of this disclosure, embodiments of the cement compositions of the present invention useful in this method may comprise any of the additives described herein below, as well as any of a variety of other additives suitable for use in subterranean applications.

Another example of a method of the present invention is a method of sealing a portion of a gravel pack or a portion of a subterranean formation; that is, a non-annular use. An example of such a method may comprise introducing a cement composition comprising aluminosilicates, an aluminate selected from the group consisting of sodium aluminate, calcium aluminate, potassium aluminate, and a combination thereof, and water into the portion of the gravel pack or the portion of the subterranean formation; and allowing the cement composition to form a hardened mass in the portion. The portions of the subterranean formation may include permeable portions of the formation and fractures (natural or otherwise) in the formation and other portions of the formation that may allow the undesired flow of fluid into, or from, the well bore. The portions of the gravel pack may include those portions of the gravel pack, wherein it is desired to prevent the flow of fluids into, or out of, the well bore. Among other things, this method may allow the sealing of the portion of the gravel pack to prevent the flow of fluids without requiring the gravel pack's removal.

Another example of a method of the present invention is a method of sealing voids located in a conduit (e.g., casing, expandable casings, liners, etc.) or in a cement sheath. Generally, the conduit may be disposed in a well bore, and the cement sheath may be located in the annulus between the conduit and a subterranean formation. An example of such a method may comprise introducing a composition comprising aluminosilicates, an aluminate selected from the group consisting of sodium aluminate, calcium aluminate, potassium aluminate, and a combination thereof, and water into the void; and allowing the cement composition to set to form a hardened mass in the void. As desired by one of ordinary skill in the art, with the benefit of this disclosure, embodiments of cement compositions of the present invention useful in this method may comprise any of the additives described herein below, as well any of a variety of other additives suitable for use in subterranean applications.

When sealing a void in a conduit, in some embodiments methods of the present invention may further comprise locating the void in the conduit; and isolating the void by defining a space within the conduit in communication with the void, wherein the cement composition may be introduced into the void from the space. The void may be isolated using any suitable technique and/or apparatus, including bridge plugs, packers, and the like. The void in the conduit may be located using any suitable technique known in the art. When sealing a void in the cement sheath, the methods of the present invention, in some embodiments, further may comprise locating the void in the cement sheath; producing a perforation in the conduit that intersects the void; and isolating the void by defining a space within the conduit in communication with the void via the perforation, wherein the cement composition is introduced into the void via the perforation. The void in the conduit may be located using any suitable technique. The perforation may be created in the conduit using any suitable technique, for example, perforating guns. The void may be isolated using any suitable technique and/or apparatus, including bridge plugs, packers, and the like.

Another example of a method of the present invention is a method of forming a plug in a well bore. An example of such a method may include introducing a cement composition comprising aluminosilicates, an aluminate selected from the group consisting of sodium aluminate, calcium aluminate, potassium aluminate, and a combination thereof, and water into the well bore at a location in the well bore; and allowing the cement composition to set to form the plug in the well bore. The plug may be formed, for example, when plugging and abandoning the well or to form a kickoff plug when changing the direction of drilling the well bore. An example of changing the direction of drilling a well bore may comprise introducing a cement composition comprising aluminosilicates, an aluminate selected from the group consisting of sodium aluminate, calcium aluminate, potassium aluminate, and a combination thereof, and water into the well bore at a location in the well bore wherein the direction of drilling is to be changed; allowing the cement composition to set to form a kickoff plug in the well bore; drilling a hole in the kickoff plug; and drilling of the well bore through the hole in the kickoff plug. As desired by one of ordinary skill in the art, with the benefit of this disclosure, embodiments of the cement compositions of the present invention may comprise any of the additives described herein, as well as any of a variety of other additives suitable for use in subterranean applications.

The various components and optional additives useful in practicing methods of the invention are now described herein below. "Aluminosilicate," as used herein, refers to a mineral comprising of aluminum, silicon, and oxygen, plus any requisite countercations to make up charge. Aluminosilicates useful in methods of the invention may include kaolin, calcined kaolin (i.e. metakaolin), class C fly ash, class F fly ash, pumice, oil shale ash, vitrified shale ash, zeolite, granulated blast furnace slag and other clay minerals, such as naturally occurring andalusite, kyanite, and sillimanite. In some embodiments, aluminosilicates employed in cement compositions disclosed herein are substantially dehydrated aluminosilicates. In some embodiments, aluminosilicates employed in cement compositions disclosed herein are calcined. As used herein, "calcined" or the process "calcination," refers to aluminosilicates that have been sufficiently thermally heated to remove hydroxyl groups from the aluminosilicates in the form of water. Thus, calcination refers to a process that removes additional water beyond the adsorbed water of hydration. In some preferred embodiments, metakaolin may be used. In some embodiments, methods of the invention employ an aluminosilicate comprising metakaolin in conjunction with other aluminosilicates. In some embodiments, SATINTONE® (calcined aluminosilicate available from BASF®) may be used in cement compositions of the invention.

Aluminosilicates form the bulk material in cement compositions of the invention and they may be present in cement compositions in an amount ranging from a lower limit of about 10% to an upper limit of about 60% by weight of the cement composition, and wherein the percentage of aluminosilicates may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

In some embodiments, methods of the invention employ a cement composition comprising an aluminate selected from the group consisting of sodium aluminate, calcium aluminate, potassium aluminate, and a combination thereof. These additives may be employed to control free water, promote early strength development, prevent cement fallback, and control fluid migration during primary cementing applications, for example. They may also be used to accelerate a cement slurry at low temperatures and impart thixotropy. These reagents may also improve compressive-strength development in the nascent set sheath and may provide control of settling in a cement slurry. VERSASET® is an example of a sodium aluminate commercially available from Halliburton Energy Services.

In some embodiments, methods of the invention employ a cement composition comprising an aluminate selected from the group consisting of sodium aluminate, calcium aluminate, potassium aluminate, and a combination thereof. The amount of sodium aluminate is less than or equal to 28% by weight of the aluminosilicates. The amount of calcium aluminate ranging from a lower limit of about 20% to an upper limit of about 80% by weight of the aluminosilicates, and wherein the percentage of calcium aluminate may range from any lower limit to any upper limit and encompass any subset between the upper and lower limits. The amount of potassium aluminate ranging from a lower limit of about 20% to an upper limit of about 80% by weight of the aluminosilicates, and wherein the percentage of potassium aluminate may range from any lower limit to any upper limit and encompass any subset between the upper and lower limit. Some of the lower limits listed above are greater than some of the listed upper limits, one skilled in the art will recognize that the selected subset will require the selection of an upper limit in excess of the selected lower limit.

In some embodiments, water used in cement compositions of the invention may comprise fresh water, saltwater (e.g., water containing one or more salts dissolved therein), brine (e.g., saturated saltwater), seawater, or combinations thereof, and may be from any source, provided that they do not contain components that might adversely affect the stability and/or performance of the cemented well bore.

In some embodiments, methods of the invention may employ additional additives in the cement compositions as deemed appropriate by one skilled in the art, with the benefit of this disclosure. Examples of such additives include, inter alia, fly ash, silica, fluid loss control additives, surfactants, dispersants, accelerators, retarders, salts, mica, fibers, formation-conditioning agents, bentonite, cement kiln dust (CKD), expanding additives, microspheres, weighting materials, defoamers, and the like. For example, the cement compositions of the present invention may be foamed cement compositions comprising one or more foaming surfactants that may generate foam when contacted with a gas, e.g., nitrogen. An example of a suitable fly ash is an ASTM class F fly ash that is commercially available from Halliburton Energy Services of Dallas, Tex. under the trade designation "POZMIX® A." An example of a suitable expanding additive comprises dead-burned magnesium oxide and is commercially available under the trade name "MICROBOND HT" from Halliburton Energy Services, Inc., at various locations.

In some embodiments methods of the invention employ cement compositions further comprising catalysts to accelerate setting of the cement compositions. Such compounds may be employed to modulate effects of cement retardants. Catalysts to accelerate setting of the cement compositions may include inorganic or organic catalysts. Suitable inorganic catalysts include, without limitation, salts of chloride, carbonate, silicates, aluminates, nitrates, sulfates, thiosulfates, phosphates like sodium hexametaphosphate, and ammonium hydroxide. In some embodiments inorganic catalysts that are salts of chloride, such as calcium chloride and sodium chloride, may be preferred. Suitable organic catalysts include, without limitation, calcium formate, ammonium formate, oxalic acid, and triethanolamine. When present, such catalysts may be present in an amount ranging from a lower limit of about 0.1% to an upper limit of about 10% by weight of the aluminosilicates, and wherein the percentage of catalyst may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

In some embodiments, methods of the invention employ cement compositions further comprising fluid loss additives. Suitable fluid loss additives may include particulate materials including, without limitation, bentonite, microsilica, asphalt, thermoplastic resins, latex, and the like. Other suitable fluid loss additives may include any water-soluble high molecular weight material such as naturally occurring polymers, modified naturally occurring polymers, synthetic polymers, and the like. Such polymers include, without limitation, cellulose derivatives such as hydroxyethyl cellulose (HEC), carboxymethyl cellulose (CMC), and carboxymethyl hydroxyethyl cellulose, acrylamide-acrylic acid copolymers (AM/AA), such as acrylamide-sodium acrylate copolymer, binary acrylamide-vinyl imidazole copolymer, ternary acrylamide-2-acrylamido-2-methylpropane sulfonic acid-imidazole copolymer, N,N-dimethylacrylamide-2-acrylamido-2-methylpropane sulfonic acid copolymer, acrylic acid-2-acrylamido-2-methylpropane sulfonic acid copolymer, diallyldimethylammonium chloride-2-acrylamido-2-methylpropane sulfonic acid copolymer, and vinyl pyrrolidone copolymers. When present, fluid loss additives may be present in an amount ranging from a lower limit of about 0.5% to an upper limit of about 5% by weight of the aluminosilicates, and wherein the percentage of fluid loss additive may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

In some embodiments, methods of the invention employ cement compositions further comprising a cement retarder. As used herein, the term "cement retarder" refers to an additive that retards the setting of the cement compositions of the present invention. Suitable cement retarders include, without limitation, citric acid, citric acid derivatives, such as sodium citrate, phosphonic acid, phosphonic acid derivatives, such as sodium phosphate, lignosulfonates, salts, sugars/carbohydrate compounds, such as celluloses exemplified by carboxymethylated hydroxyethylated celluloses, organic acids, synthetic co- or ter-polymers comprising sulfonate and carboxylic acid groups, and/or borate compounds. Examples of suitable borate compounds include, without limitation, sodium tetraborate and potassium pentaborate. Examples of suitable organic acids include, without limitation, gluconic acid, citric acid and tartaric acid. Commercially available cement retarders, include, without limitation, those available from Halliburton Energy Services, Inc. (Duncan, Okla.) under the trademarks HR® 4, HR® 5, HR® 7, HR® 12, HR® 15, HR® 25, HR® 601, SCR™ 100, and SCR™ 500 retarders.

Generally, the cement retarder may be present in the cement compositions used in the present invention in an amount sufficient to delay the setting of the cement composition in a subterranean formation for a desired time. More particularly, the cement retarder may be present in the cement compositions used in the present invention in an amount ranging from a lower limit of about 0.1% to an upper limit of about 10% by weight of the aluminosilicates, and wherein the percentage of cement retarder may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit. In certain embodiments, the cement retarder may be present in the cement compositions used in the present invention in an amount ranging from a lower limit of about 0.5% to an upper limit of about 4% by weight of the aluminosilicates, and wherein the percentage of cement retarder may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

In some embodiments, methods of the invention employ cement compositions further comprising a dispersant. When present, the dispersant, among other things, may control the rheology of the cement composition and stabilize the cement composition over a broad density range. A variety of dispersants known to those skilled in the art may be used in accordance with the present invention. An example of a suitable dispersant comprises a water-soluble polymer prepared by the caustic-catalyzed condensation of formaldehyde with acetone wherein the polymer contains sodium sulfate groups, which dispersant is commercially available under the trade designation "CFR-3™" dispersant from Halliburton Energy Services, Inc. (Duncan, Okla.). Another suitable dispersant is commercially available under the trade designation "CFR-2™" dispersant, also from Halliburton Energy Services, Inc. When used, the dispersant may be present in the cement compositions of the present invention in an amount ranging from a lower limit of about 0.1% to an upper limit of about 5.0% by weight of the aluminosilicates, and wherein the percentage of dispersant may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit. In some embodiments, the dispersant may be present in the cement compositions of the present invention in an amount ranging from a lower limit of about 0.1% to an upper limit of about 3.0% by weight of the aluminosilicates, and wherein the percentage of dispersant may range from any lower limit to any upper limit and encompass any subset between the upper and lower limits. Some of the lower limits listed above are greater than some of the listed upper limits. One skilled in the art will recognize that the selected subset will require the selection of an upper limit in excess of the selected lower limit.

Cement compositions suitable for use in the present invention may be foamed or non-foamed. In some embodiments, methods of the invention may employ cement compositions further comprising a defoamer. An example of a suitable defoamer is commercially available from Halliburton Energy Services, Inc., of Duncan, Okla., under the trade name D-AIR 3000L™ antifoaming agent. When present, the defoamer may be present in an amount ranging from a lower limit of about 0.1% to an upper limit of about 1.0% by weight of the aluminosilicates, and wherein the percentage of antifoaming agent may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

In some embodiments, the cement compositions employed in methods of the present invention may be foamed cement compositions comprising one or more foaming surfactants that may generate foam when contacted with a gas, e.g., nitrogen. As will be understood by one of skill in the art, foamed cement compositions may be indicated where a formation is relatively weak and a lighter weight set cement sheath is desired. When present, foaming surfactants may be present in an amount ranging from a lower limit of about 0.1% to an upper limit of about 1.0% by weight of the aluminosilicates, and wherein the percentage of foaming surfactant may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

In some embodiments, methods of the invention employ cement compositions further comprising a weighting agent. Suitable weighting agents may include, without limitation, barite, precipitated barite, submicron precipitated barite, hematite, ilmentite, manganese tetraoxide, galena, and calcium carbonate. The weighting agent may be present in the cement composition in an amount sufficient for a particular application. For example, the weighting agent may be included in the cement composition to provide a particular density. In certain embodiments, the weighting agent may be present in the cement composition in an amount up to about 70% by volume of the cement composition (v %) (e.g., about 5%, about 15%, about 20%, about 25%, about 30%, about 35%, about 40%, about 45%, about 50%, about 55%, about 60%, about 65%, up to about 70%). In certain embodiments, the weighting agent may be present in the cement composition in an amount ranging from a lower limit of about 10% to an upper limit of about 40% by weight of the aluminosilicates, and wherein the percentage of weighting agent may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit. By way of example, the cement composition may have a density of greater than about 9 pounds per gallon ("lb/gal"). In certain embodiments, the cement composition may have a density of about 9 lb/gal to about 22 lb/gal.

In some embodiments, the present invention provides a method comprising introducing a cement composition into a subterranean formation, wherein the cement composition comprises a metakaolin, a secondary pozzolan additive, an aluminate selected from the group consisting of sodium aluminate, calcium aluminate, potassium aluminate, and a combination thereof, and water, and the method further comprising allowing the cement composition to set to provide a set cement sheath, wherein the set cement sheath does not contain a Portland cement. In some such embodiments, methods of the invention may employ a cement composition further comprising one or more of a catalyst to accelerate setting of the cement composition, a fluid loss additive, a cement retarder, a dispersant, a defoamer, and a weighting agent.

In some embodiments, the cement composition comprises a metakaolin, a secondary pozzolan additive, an aluminate selected from the group consisting of sodium aluminate, calcium aluminate, potassium aluminate and a combination thereof, and water. In some embodiments, the cement composition consists essentially of a metakaolin, a secondary pozzolan additive, an aluminate selected from the group consisting of sodium aluminate, calcium aluminate, potassium aluminate, and a combination thereof, and water. In some preferred embodiments, the cement composition does not include Portland cement.

In some embodiments, the cement composition comprises an aluminosilicate, an aluminate selected from the group consisting of sodium aluminate, calcium aluminate, potassium aluminate, and a combination thereof, and water. In some embodiments, the cement composition consists essentially of an aluminosilicate, an aluminate selected from the group consisting of sodium aluminate, calcium aluminate, potassium aluminate, and a combination thereof, and water. In some preferred embodiments, the cement composition does not include Portland cement.

In some embodiments, the cement composition comprises an aluminate selected from the group consisting of sodium aluminate, calcium aluminate, potassium aluminate, and a combination thereof, and water. In some embodiments, the cement composition consists essentially of an aluminate selected from the group consisting of sodium aluminate, calcium aluminate, potassium aluminate, and a combination thereof, and water. In some preferred embodiments, the cement composition does not include Portland cement.

In some embodiments, the present invention provides a cement composition comprising aluminosilicates, at least one of a sodium aluminate and a calcium aluminate, and water, wherein the cement composition does not include a Portland cement. Cement compositions of the invention may further comprise a catalyst to accelerate setting of the cement composition, a fluid loss additive, a cement retarder, a dispersant, a defoamer, and/or a weighting agent as described herein above. In some embodiments, the cement compositions of the invention may further comprise silica fume, diatomaceous earth, granulated blast furnace slag, pumice, and calcined shale. In some embodiments, the cement compositions of the invention may employ a mixture of aluminosilicates that is metakaolin and fly ash. Any of the aforementioned additives may be employed in any combination as would be evident to those skilled in the art.

In some embodiments, the present invention provides cement compositions consisting essentially of aluminosilicate, at least one of a sodium aluminate and a calcium aluminate, and water. Other embodiments of the present invention may provide methods of subterranean cementing operations using a cement composition that consists essentially of aluminosilicate, at least one of a sodium aluminate and a calcium aluminate, and water.

To facilitate a better understanding of the present invention, the following examples of preferred or representative embodiments are given. In no way should the following examples be read to limit, or to define, the scope of the invention.

Example

This Example shows the preparation and characterization of a variety of cement compositions useful in the practice of methods of the invention.

Cement compositions in Table 1 below were prepared according to the following general procedure: Metakaolin, POZMIX A and other solid additives were dry blended. D-Air 3000L was added into water and then the dry blend was suspended to form slurry according to API procedure 10B-2.

Metakaolin is a pozzolanic material. It is a chemical phase that forms upon thermal treatment of kaolinite. Kaolinite's chemical composition is $Al_2O_3:2SiO_2.2H_2O$ and as a result of thermal treatment the water is driven away to form an amorphous aluminosilicate called metakaolin. POZMIX A (Fly ash) is a residue from the combustion of coal, which exhibits pozzolanic properties. Versaset is a sodium aluminate commercially available from Halliburton Energy Services. Secar 60 is a calcium aluminate commercially available from Halliburton Energy Services. SHMP is sodium hexametaphosphate and is used as an accelerator). Alcomer is a fluid loss control additive which is an amphoteric copolymer comprising diallyldimethylammonium chloride and 2-Acrylamido-2-methylpropane sulfonic acid commercially available from BASF chemical company. HR-800 is a acyclic oligosaccharide type, non-lignin based cement retarder commercially available from Halliburton Energy Services. HR-800 was added as a material diluted with gypsum in a 2:1 ratio. CFR-3 is a dispersant commercially available from Halliburton Energy Services. D-Air 3000L is a defoamer commercially available from Halliburton Energy Services. Each of the designs below had a slurry composition density of 13.5 ppg.

TABLE 1

| | Amount (%) | | |
|---|---|---|---|
| Material | Design 1 | Design 2 | Design 3 |
| Water | 173 | 190 | 209 |
| Metakaolin | 100 | 100 | 100 |
| POZMIX A | 100 | 125 | 150 |
| Versaset | 55 | 60 | 70 |
| Secar 60 | 25 | 25 | 25 |
| SHMP | 10 | 10 | 10 |
| Alcomer | 4 | 4 | 4 |
| HR-800 | 4 | 4 | 4 |
| CFR-3 | 3 | 3 | 3 |
| D-Air 3000L | 0.1 gal/sk | 0.1 gal/sk | 0.1 gal/sk |

The rheology of the slurries was measured using Fann 35 viscometer at speeds of 3, 6, 30, 60, 100, 200, 300, and 600 rpm. The slurries were thin and pourable, indicating pumpability through a well bore. Table 2, below, shows the results for Design 1, in particular.

TABLE 2

| (Rheology of Design 1) | | | | | | | | |
|---|---|---|---|---|---|---|---|---|
| | Fann 35 Viscosity Numbers | | | | | | | |
| Temp. | 3 | 6 | 30 | 60 | 100 | 200 | 300 | 600 |
| RT | 19 | 26 | 49 | 74 | 101 | 166 | 228 | 300+ |
| 145° F. | 28 | 36 | 79 | 113 | 144 | 208 | 273 | 300+ |

Figure 2:
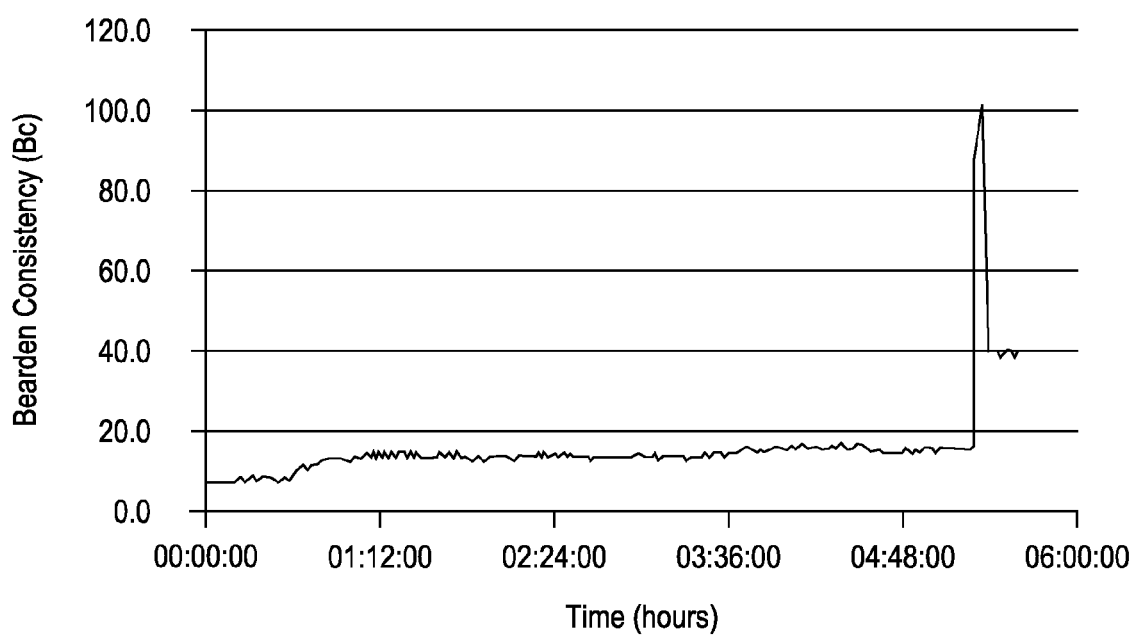
FIG. 2 is a thickening time chart for another exemplary cement composition, in accordance with embodiments disclosed herein.
Figure 3:
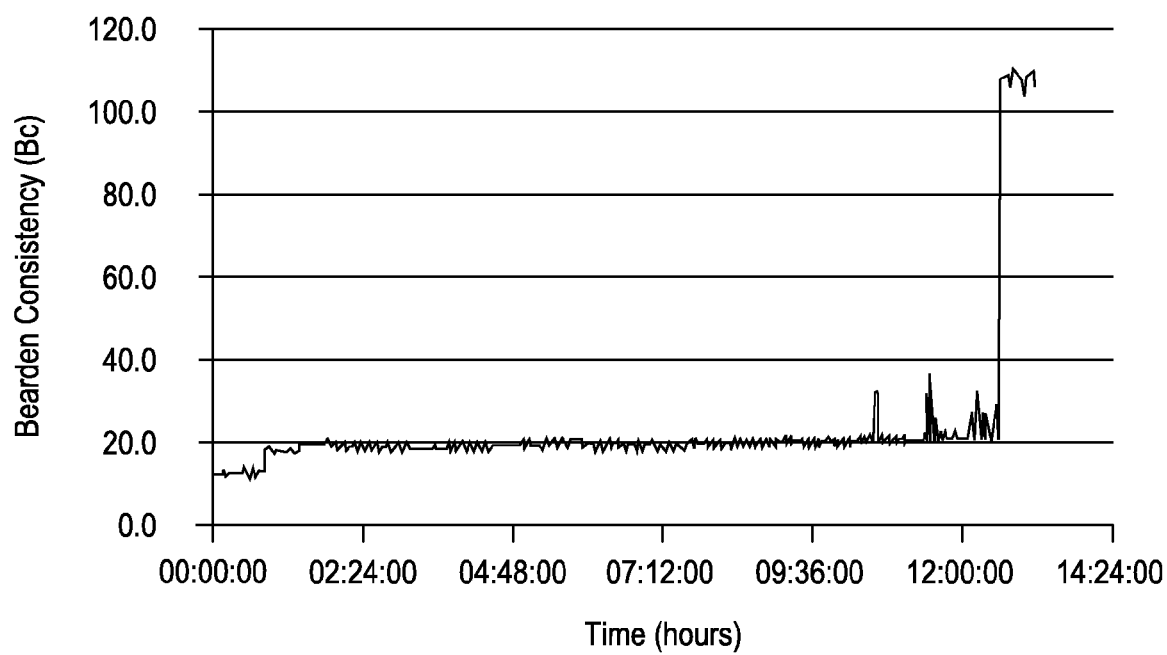
FIG. 3 is a thickening time chart for yet another exemplary cement composition, in accordance with embodiments disclosed herein.

The slurries were tested for thickening time at 165° F. BHCT (Bottom Hole Circulation Temperature) using HPHT consistometer according to API standard procedure. The thickening time was 3 to 12 hours depending on the composition of the slurry (Table 3 and FIGS. 1-3).

The thickening time refers to the time required for the composition to achieve 70 Bearden units of Consistency (Bc). Consistency is a measure of the pumpability of cement slurry measured in Bearden units (Bc), and when a cement slurry reaches a Consistency of 70 Bc, it is no longer considered a pumpable slurry.

The slurries were poured in the mold and cured at 180° F. BHST (Bottom Hole Static Temperature) at 3000 psi. The cured cubes were crushed using a hydraulic press to estimate the strength. The compositions develop the strength of about 600 psi within 16 hours and it increases with time (Table 3).

TABLE 3

| | | Crush Strength (psi) | | |
|---|---|---|---|---|
| Slurry Design | Thickening time (HR:MM) | 16 hrs | 48 hrs | 72 hrs |
| 1 | 3:55 | 690 | 1062 | 1257 |
| 2 | 5:20 | 627 | 1108 | 1230 |
| 3 | 12:41 | 622 | 1262 | 1338 |

The slurry design 1 was cured at 180° F., 3000 psi for 7 days. The cured cylinder was exposed to carbon dioxide at 200° F. for 30 days. The crush strength of the cylinder after exposing to carbon dioxide was 3040 psi.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    introducing a cement composition into a subterranean formation having corrosive components therein, wherein the cement composition comprises:
        an aluminosilicate;
        a potassium aluminate at 20% to 80% by weight of the aluminosilicate;
        a fluid loss control additive comprising a copolymer of diallyldimethylammonium chloride and 2-acrylamido-2-methylpropane sulfonic acid; and
        water; and
    allowing the cement composition to set to provide a set cement sheath;
        wherein the set cement sheath is resistant to degradation from the corrosive components within the subterranean formation.

2. The method of claim 1, wherein the corrosive components comprise one selected from the group consisting of carbon dioxide, hydrogen sulfide, hydrogen chloride, carbonic acid, and mixtures thereof.

3. The method of claim 1, wherein the cement composition further comprises: a catalyst to accelerate setting of the cement composition, a fluid loss control additive, a cement retarder, a dispersant, a defoamer, a weighting agent, or a combination thereof.

4. The method of claim 1, wherein the aluminosilicate is a metakaolin.

5. The method of claim 1, wherein the cement composition further comprises a pozzolan selected from the group consisting of fly ash, silica fume, granulated blast furnace slag, pumice, and calcined shale.

6. A cement composition comprising:
    an aluminosilicate;
    a potassium aluminate at 20% to 80% by weight of the aluminosilicate;
    a fluid loss control additive comprising a copolymer of diallyldimethylammonium chloride and 2-acrylamido-2-methylpropane sulfonic acid; and
    water;
        wherein the cement composition does not include a Portland cement.

7. The cement composition of claim 6, further comprising one or more of a catalyst to accelerate setting of the cement composition, a fluid loss control additive, a cement retarder, a dispersant, a defoamer, and a weighting agent.

8. The cement composition of claim 6, wherein the aluminosilicate is a metakaolin.

9. The cement composition of claim 6, further comprising a pozzolan selected from the group consisting of fly ash, silica fume, granulated blast furnace slag, pumice, and calcined shale.

10. A method comprising:
    introducing a cement composition into a subterranean formation, wherein the cement composition comprises:
        a metakaolin;
        a secondary aluminosilicate;
        a potassium aluminate at 20% to 80% by weight of the aluminosilicate;
        a fluid loss control additive comprising a copolymer of diallyldimethylammonium chloride and 2-acrylamido-2-methylpropane sulfonic acid; and
        water; and
    allowing the cement composition to set to provide a set cement sheath;
        wherein the set cement sheath does not contain a Portland cement.

11. The method of claim 10, wherein the cement composition further comprises one or more of a catalyst to accelerate setting of the cement composition, a fluid loss control additive, a cement retarder, a dispersant, a defoamer, and a weighting agent.

12. The method of claim 10, wherein the aluminosilicate is a metakaolin.

13. The method of claim 10, wherein the cement composition further comprises a pozzolan selected from the group consisting of fly ash, silica fume, granulated blast furnace slag, pumice, and calcined shale.

* * * * *